United States Patent
Chen et al.

(10) Patent No.: US 7,374,729 B2
(45) Date of Patent: May 20, 2008

(54) EXHAUST GAS TREATMENT CATALYST

(75) Inventors: Shau-Lin Franklin Chen, Piscataway, NJ (US); Zhicheng Hu, Edison, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 503 days.

(21) Appl. No.: 10/812,542

(22) Filed: Mar. 30, 2004

(65) Prior Publication Data

US 2005/0227867 A1 Oct. 13, 2005

(51) Int. Cl.
*B01D 50/00* (2006.01)
*B01J 23/00* (2006.01)
*B01J 21/00* (2006.01)
*B01J 20/00* (2006.01)

(52) U.S. Cl. .............. 422/177; 502/325; 502/326; 502/327; 502/332; 502/333; 502/334; 502/339; 502/304; 502/349; 502/350; 502/351; 502/355; 502/415; 502/439; 502/527.13; 502/527.18

(58) Field of Classification Search ........ 502/325–327, 502/332–334, 339, 349–351, 355, 415, 439, 502/527.13, 527.18, 304; 422/177
See application file for complete search history.

(56) References Cited

U.S. PATENT DOCUMENTS

| | | | |
|---|---|---|---|
| 4,134,860 A | 1/1979 | Hindin et al. | 502/327 |
| 4,335,023 A | 6/1982 | Dettling et al. | 252/466 PT |
| 4,714,694 A | 12/1987 | Wan et al. | 502/304 |
| 4,727,052 A | 2/1988 | Wan et al. | 502/327 |
| 4,868,148 A | 9/1989 | Henk et al. | 502/303 |
| 5,010,051 A | 4/1991 | Rudy | 502/304 |
| 5,057,483 A | 10/1991 | Wan | 502/304 |
| 5,063,192 A | 11/1991 | Murakami et al. | 502/303 |
| 5,212,142 A | 5/1993 | Dettling | 502/304 |
| 5,462,907 A | 10/1995 | Farrauto et al. | 502/304 |
| 5,556,825 A * | 9/1996 | Shelef et al. | 502/303 |

(Continued)

FOREIGN PATENT DOCUMENTS

EP 0 992 276 A1 4/2000

(Continued)

*Primary Examiner*—Cam N. Nguyen
(74) *Attorney, Agent, or Firm*—Melanie L. Brown; Brian W. Stegman; Scott S. Serrilla

(57) ABSTRACT

Provided are an exhaust treatment catalyst and an exhaust article containing the catalyst. The catalyst comprises:
 (a) a carrier;
 (b) a first layer deposited on the carrier, said first layer comprising substantially only at least one refractive metal oxide;
 (c) a second layer deposited on the first layer, said second layer comprising substantially only at least one oxygen storage component and at least one binder therefor; and
 (d) a third layer deposited on the second layer, said third layer comprising at least one layer of one or more platinum group metal components supported on a refractory metal oxide support.

Optionally, a fourth layer is deposited on the third layer wherein the fourth layer comprises one or more platinum group metal components supported on a refractory metal oxide support. As a further option, an overcoat layer may be deposited on the third or fourth layer wherein the overcoat layer comprises a catalyst poison sorbent. Also provided are methods for preparing the catalyst and methods for monitoring the exhaust storage capacity of an exhaust article containing the catalyst.

19 Claims, 4 Drawing Sheets

U.S. PATENT DOCUMENTS

| | | | |
|---|---|---|---|
| 5,597,771 A | 1/1997 | Hu et al. | 502/304 |
| 5,627,124 A | 5/1997 | Farrauto et al. | 502/304 |
| 5,888,464 A | 3/1999 | Wu et al. | 423/213.5 |
| 5,898,014 A | 4/1999 | Wu et al. | 502/302 |
| 5,948,723 A * | 9/1999 | Sung | 502/303 |
| 5,992,142 A | 11/1999 | Pott | 60/274 |
| 6,044,644 A | 4/2000 | Hu et al. | 60/302 |
| 6,087,298 A * | 7/2000 | Sung et al. | 502/333 |
| 6,248,688 B1 | 6/2001 | Wu et al. | 502/302 |
| 6,254,842 B1 * | 7/2001 | Hu et al. | 423/213.5 |
| 6,294,140 B1 * | 9/2001 | Mussmann et al. | 423/213.5 |
| 6,306,794 B1 * | 10/2001 | Suzuki et al. | 502/304 |
| 6,348,430 B1 * | 2/2002 | Lindner et al. | 502/304 |
| 6,764,665 B2 * | 7/2004 | Deeba et al. | 423/239.1 |
| 6,852,665 B2 * | 2/2005 | Morikawa et al. | 502/302 |
| 7,189,376 B2 * | 3/2007 | Kumar et al. | 422/177 |
| 7,202,194 B2 * | 4/2007 | Muhammed et al. | 502/304 |
| 2002/0132730 A1 * | 9/2002 | Hwang et al. | 502/212 |
| 2003/0021745 A1 | 1/2003 | Chen | 423/239.1 |
| 2003/0061860 A1 * | 4/2003 | Hu et al. | 73/23.31 |
| 2003/0100447 A1 | 5/2003 | Deeba et al. | 502/339 |
| 2004/0198595 A1 * | 10/2004 | Chen | 502/328 |
| 2005/0129588 A1 * | 6/2005 | Nunan | 422/177 |
| 2006/0251549 A1 * | 11/2006 | Kumar et al. | 422/180 |

FOREIGN PATENT DOCUMENTS

| | | |
|---|---|---|
| EP | 1 121 981 A2 | 8/2001 |
| WO | WO 92/09848 | 6/1992 |
| WO | WO 97/23278 | 7/1997 |
| WO | WO 99/55459 | 11/1999 |
| WO | WO 01/74476 A1 | 10/2001 |

* cited by examiner

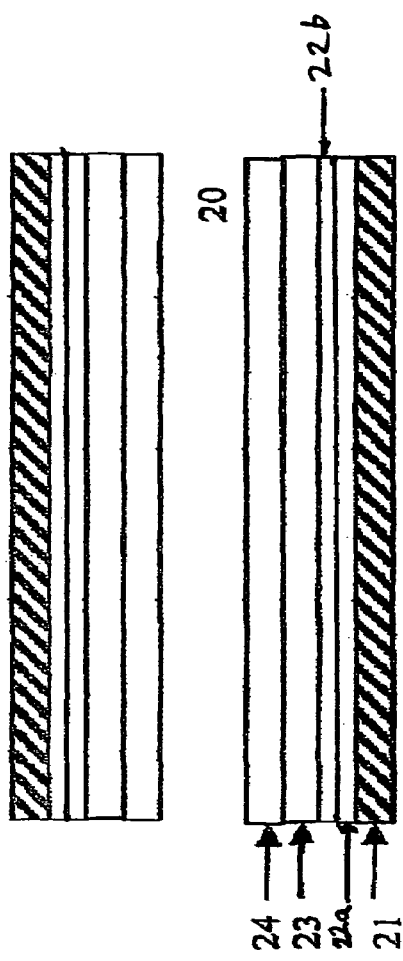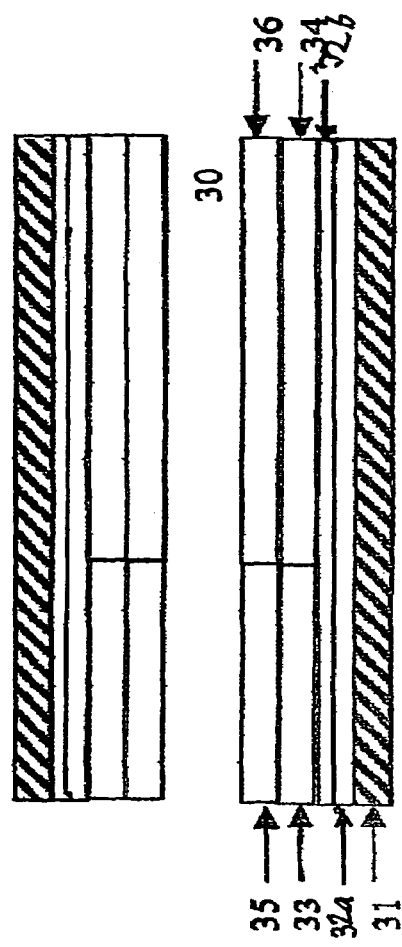

EXHAUST GAS TREATMENT CATALYST

FIELD OF THE INVENTION

The invention relates to an exhaust treatment catalyst and to an exhaust article containing the catalyst, as well as to methods for preparing the catalyst and the article and methods for their use in on-board diagnostic ("OBD") systems.

BACKGROUND OF THE INVENTION

Three-way conversion (TWC) catalysts have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, exhaust articles containing a TWC catalyst are located in the exhaust gas line of internal combustion engines. The TWC catalysts promote the oxidation by oxygen in the exhaust gas of the unburned hydrocarbons and carbon monoxide and the reduction of nitrogen oxides to nitrogen.

Various regulatory agencies require that emission reduction equipment incorporated on a vehicle be continuously monitored by OBD systems. The function of these OBD systems is to report and set fault codes or alarm signals when the emission control devices no longer meet the mandated emission levels. One of the systems to be monitored is the TWC catalyst is used to simultaneously reduce the levels of carbon monoxide, nitrogen oxides, and hydrocarbons in the exhaust gases.

Internal combustion engines produce exhaust gases having compositions that oscillate over time between air/fuel ("A/F") ratios that are slightly rich of stoichiometric and ratios that are slightly lean of stoichiometric. Ceria and other oxygen storage components are often included in automotive catalyst compositions to store oxygen when A/F ratios are lean of stoichiometric so that oxygen can be released when A/F ratios become rich to combust the unburned hydrocarbons and carbon monoxide. TWC catalysts are therefore characterized in one aspect with an oxygen storage capacity. As the TWC catalyst ages, however, its ability to store oxygen diminishes and the efficiency of the catalytic converter decreases. Based on this fact, current OBD systems in use today utilize linear air/fuel ratio sensors. Such sensors are typically referred to as exhaust gas oxygen sensors and are hereinafter referred to as "UEGO" if unheated and "HEGO" if heated. Typically, the UEGO will be located upstream of the catalyst and a HEGO and/or a UEGO will be located downstream of the catalyst to provide an estimate of a direct measurement of the oxygen storage capacity of the catalyst. Through calibration, this measurement of an estimate of the oxygen storage capacity of the catalyst can be related to the ability of the catalyst to convert the regulated exhaust gas emissions, i.e., the conversion efficiency of the catalyst. The catalyst deterioration can be therefore be monitored.

In particular, a typical method uses both UEGO and HEGO sensors that are electrochemical exhaust gas sensors, and their switching characteristics to ultimately monitor catalyst deterioration. The sensors detect whether the exhaust is rich or lean of stoichiometric. The method relies on measuring a ratio of the number of voltage level transitions (switches, e.g., across 0.5 volts) of two sensors, one placed upstream of the catalyst and one placed downstream of the catalyst. Contemporary catalytic converters have a significant oxygen storage capacity that dampens out the normal air/fuel cycling used in engine controller strategies. Therefore, the sensor placed upstream of the catalyst (measuring untreated exhaust from the engine) records a switch every time the exhaust gas moves from either a lean-to-rich or rich-to-lean state. The sensor mounted downstream of the catalyst, however, does not record a switch every time the upstream sensor switches, because the oxygen storage capacity of the catalyst acts as an integrator, smoothing out the A/F oscillations. As the catalyst deteriorates because of aging, the oxygen storage capacity of the catalyst decreases and therefore the downstream sensor records more switches. By monitoring the downstream sensor and upstream sensor switching transitions for a long period and ratioing the number of switching transitions, a parameter referred to as the switch ratio is obtained. This switch ratio is an indicator of the oxygen storage capacity of the catalyst. This switch ratio is then used as a diagnostic parameter for determining the pollutant conversion efficiency of the catalyst.

The amount of oxygen storage capacity that different vehicle original equipment manufacturers "OEM"s) require for various exhaust platforms is dependent on a number of factors including engine displacement, vehicle type, catalyst volume, catalyst location and engine management and can vary greatly according to the particulars of a vehicle and its associated exhaust platform. Alteration of the oxygen storage capacity of typical catalysts, however, can alter the catalysts' characteristics including their conversion efficiency. An increase or decrease in oxygen storage capacity to meet the OBD monitoring requirement can therefore be a burdensome process that can require multiple trials to finally arrive at the optimum oxygen storage capacity for a given exhaust system without sacrificing or altering catalytic efficiency or performance.

In addition to meeting on board diagnostic monitoring requirements, catalysts preferably meet requirements for efficiently using platinum group metals as catalytic agents due to the high cost of these metals. Strategies that have been used to optimize conversion efficiency with minimized platinum group metal usage include the use of zoned, gradient zoned and layered catalyst composites. Examples of the use of layers are disclosed in U.S. Pat. No. 5,597,771, while the use of zones is described in co-pending U.S. application Ser. No. 09/067,820 and WO 92/09848. Segregation of precious metals, such as platinum group metals, into layers and zones permits more control of the physical and chemical environment in which the individual precious metal components operate. For example, the catalytic activity of precious metal components are often more effective when in close proximity to certain promoters or other additives. In other instances to improve hydrocarbon combustion efficiency during cold starts, it is preferable to have high concentrations of certain catalytic agents such as palladium in frontal or upstream zones of the catalyst so that the exhaust gases contact these catalytic agents immediately and combustion of these pollutants can begin at low temperatures, as disclosed in U.S. Pat. No. 6,087,298.

The catalytic layers and zones are formed from washcoat compositions typically containing at least a refractory oxide support such as activated alumina and one or more platinum group metal ("PGM") components such as platinum or palladium, rhodium, ruthenium and iridium. Other additives including promoters and washcoat stabilizers are often added. The washcoat compositions are deposited on a suitable carrier or substrate such as a monolithic carrier comprising a refractory ceramic honeycomb or a metal honeycomb structure, or refractory particles such as spheres or short, extruded segments of a suitable refractory material.

Optimization of a catalyst so that it meets regulatory requirements for minimization of pollutants and durability, as well as an automobile manufacturer's requirements for precious metal usage and oxygen storage capacity for a given vehicle/exhaust platform, often requires extensive experimentation. The experimentation can include iterative reformulation of catalyst compositions and various layer or zone combinations followed by performance testing. It is often the case that the final optimized formulation of a one catalyst that successfully meets the requirements of one exhaust platform having a specific oxygen storage capacity requirement, cannot be used for a different exhaust platform having a different oxygen storage capacity requirement without extensive reformulation and performance testing. It would be preferable from the standpoint of both time and expense to have a more adaptable catalyst. Once having optimized a catalyst for catalyst performance and precious metal usage, it would be particularly desirable to be able to alter only the oxygen storage capacity of the catalyst without altering the performance requirements so that it can be used for different exhaust platforms, all having different OSC requirements.

SUMMARY OF THE INVENTION

In one embodiment, the invention relates to an exhaust treatment catalyst and an exhaust article having such a catalyst, an upstream UEGO sensor and a downstream HEGO sensor and/or UEGO sensor. The catalyst is of the multi-layered type comprising a carrier, preferably a honeycomb carrier; a first layer (also referred to herein as the bottom layer) comprising at least one refractory metal oxide; a second layer (also referred to herein as the middle layer) thereon comprising primarily at least one oxygen storage component ("OSC") having a concentration that provides a predetermined oxygen storage capacity; and at least one third layer (also referred to herein as at least one top layer) deposited on the second layer comprising a PGM component. The predetermined oxygen storage capacity preferably correlates with the TWC performance of the catalyst.

In one embodiment, the bottom layer is substantially free of PGM components. In another embodiment, the bottom layer is substantially free of OSCs. In yet another embodiment, the catalyst contains two layers of PGM components disposed on the second layer. Optionally, an overcoat layer may be disposed on the PGM component layer(s); such overcoat layer will generally comprise a material that will absorb contaminants in the exhaust gas, e.g., $SO_x$ zinc compounds, phosphorus compounds, etc. that may poison the catalyst. The multi-layered catalyst of the invention optionally contains stabilizers, promoters and other additives that are typically employed in TWC catalyst preparations.

In yet another embodiment, the catalyst has at least two catalytic zones. In this zoned catalyst embodiment, the downstream EGO sensor can either be located between the catalytic zones or can be located downstream of all the catalytic zones. The exhaust article is preferably used for treating exhaust gas from a gasoline engine having an exhaust outlet leading to the catalyst. The exhaust article can contain upstream and downstream conduits. In these embodiments, the catalyst is interposed and in train with the upstream and downstream conduits.

In some embodiments of the exhaust article, the catalyst is located in a close-coupled position, while in other embodiments it is located downstream in an underbody position.

The upstream and downstream sensors used in the exhaust article can be UEGO or HEGO sensors. Preferably, in the exhaust article, the sensors located in front of the catalyst are UEGO sensors and the sensors located downstream of the catalyst are HEGO sensors.

In another embodiment, the invention relates to a multi-zoned, multi-layered composite exhaust gas treatment catalyst. In this embodiment, the catalyst contains the multiple layers as described above. The third PGM component layer is disposed on the second layer and the fourth PGM component layer is disposed on the third PGM component layer. Each third and fourth layers contain two zones, referred to as upstream and downstream zones. Each of the four catalytic zones contains different PGM formulations. The first upstream zone includes palladium and platinum components, and a refractory oxide support. The first downstream zone has a platinum component and a refractory oxide support. The second upstream zone contains platinum, palladium, and rhodium components, as well as a refractory oxide support. The second downstream zone includes a rhodium component and a refractory oxide support. In exhaust articles of the invention, the multi-zoned, multi-layered catalyst is preferably in a close-coupled position.

In another aspect, the present invention relates to a method for preparing the exhaust treatment catalyst comprised of the layers described above. The method includes the step of determining a concentration of the OSC(s) in the second layer that provides a predetermined oxygen storage capacity and special decaying characteristics. The predetermined oxygen storage capacity and special decaying characteristics correlates with the TWC performance of the catalyst.

Another aspect of the invention relates to a method of monitoring the oxygen storage capacity of an exhaust article having the multi-layered exhaust treatment catalyst described above. The exhaust article also has an upstream heated exhaust gas oxygen sensor and a downstream HEGO sensor. The method includes: passing an exhaust gas containing unburned hydrocarbons, nitrogen oxides, oxygen and carbon monoxide through the exhaust article; recording a frequency of voltage changes for each of the upstream and downstream HEGO sensors; comparing the recorded frequencies; and sending a fault signal when the recorded frequencies reach a predetermined ratio. Preferably, the predetermined ratio correlates with the TWC performance of the catalyst.

BRIEF DESCRIPTION OF THE DRAWINGS

FIGS. 2 and 3 are schematic diagrams illustrating various designs of the exhaust treatment catalyst of the present invention.

DETAILED DESCRIPTION OF THE INVENTION

One aspect of the invention relates to an exhaust article suitable for treating exhaust gases in the exhaust system of an internal combustion engine. In particular, the invention includes exhaust articles having a multi-layered and/or a multi-zoned, multi-layered exhaust catalyst that are adaptable to a variety of exhaust platforms, as well as exhaust gas oxygen sensors mounted upstream and downstream of the catalyst.

Figure 1:
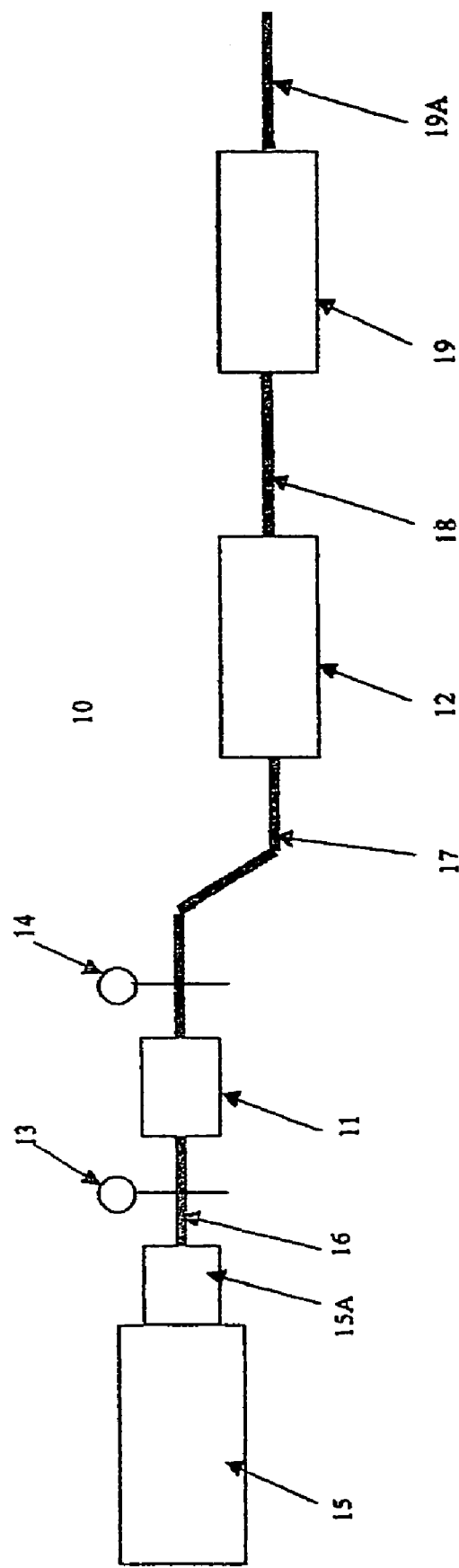
FIG. 1 is a schematic illustration of a motor vehicle exhaust line containing exhaust gas oxygen sensors, a close-coupled catalyst, and an underbody catalyst.

One preferred embodiment of the invention is depicted in FIG. 1. A motor vehicle exhaust line (10) includes a close-coupled catalyst (11), an underbody catalyst (12), an upstream exhaust gas oxygen sensor (13), and a downstream exhaust gas oxygen sensor (14). The inventive article can further include a gasoline engine (15). An engine exhaust manifold (15A) is connected through an upstream conduit (16) with the close-coupled catalyst. A downstream conduit (17) connected to the close-coupled catalyst leads to the underbody catalyst (12). The underbody catalyst is typically and preferably connected to a muffler (19) through underfloor exhaust pipe (18). The muffler is connected to a tail pipe (19A) having a tail pipe outlet that opens to the environment.

Typical TWC catalysts are often formed with layers or zones containing OSCs in admixture with catalytically effective amounts of catalytic agents, usually PGM components. Applicants have found that by providing a catalyst with (i) a discrete first, i.e., bottom, layer comprising substantially only at least one refractive metal oxide with little or no OSCs and with little or no PGMs therein, and (ii) a discrete second layer overlying the first layer comprising substantially only at least one OSC and at least one binder therefor and with little or no PGMs contained therein, and (iii) providing at least one separate catalytic, i.e., a PGM component layer, a catalyst is produced wherein a significant portion of the OSCs are separated from the layers containing the bulk of the PGMs, relative to catalysts that contain OSCs and PGMs together in the same layer adjacent to the carrier and/or in the catalytic layers. As a result, the oxygen storage capacity of the exhaust treatment catalyst of the invention can be adjusted without negatively impacting the catalytic functions of the PGM component-containing catalytic layers, such as their hydrocarbon oxidation and light-off activities. In addition, the conversions of carbon monoxide and nitrogen oxides are not negatively unaffected. The catalysts of the invention are advantageously integrated into a variety of exhaust platforms that have different oxygen storage capacity requirements.

While not being limited by theory, it is believed that the OSC(s) in the second layer contributes less to the reduction and oxidation ("redox") reactions when flow rate of exhaust gas (VHSV, volumetric hourly space velocity) is relatively high, i.e., at hard acceleration mode, while the residence time is short, and penetration depth is relatively shallow. This configuration will allow feed gases react more effectively with PGM-containing top layers at high VHSV conditions so that conversion efficiency can be maximized. On the other hand, at idling or low speed cruise mode, or, at the slower flow rate, the residence time and penetration depth is increased, and therefore allow OSC(s) in the bottom layer(s) to efficiently participating for the on-board diagnosis.

The exhaust articles of the invention are advantageous for any exhaust system including those wherein the measurement of the catalyst's oxygen storage capacity is used to monitor the catalyst's conversion efficiency. This is currently a common method is used to monitor catalyst efficiency in, for example, a motor vehicle. Preferably the exhaust being monitored is from an internal combustion engine, more preferably from a gasoline engine.

It is an advantageous feature of the invention, that the type and amount of OSC(s) in the catalyst of the invention can be conveniently varied to comply with the original equipment manufacturer's (OEM) specification for a given exhaust platform and on-board diagnostic (OBD) system. It is often the case that different vehicle manufacturers specify different oxygen storage capacity requirements for different exhaust platforms and different OBD systems. The type and quantity of the OSC(s) in the second layer can be selected in a manner to simulate durability or decaying pattern of components in PGM-containing layers, while having a minimal adverse effect, if any, on the catalyst's performance characteristics such as its three way conversion efficiency, durability and PGM-component catalytic activities. Thus, adding or reducing the amount of OSC(s) in the second layer to comply with the OEM's oxygen storage capacity requirement does not require adjustment of other PGM-related parameters affecting the catalyst's performance characteristics.

The exhaust article of the invention includes exhaust gas oxygen sensors that are used to determine the amount of oxygen storage capacity of a catalyst. An upstream EGO is placed upstream of a catalyst to measure the composition of the several feed gases, including oxygen concentration in the exhaust stream from the engine before they contacts the catalyst. As used in this invention then, the catalyst to be monitored is always the first (or upstream) catalyst in the exhaust system (as sensed by an exhaust stream), if more than one catalyst is used. A second HEGO sensor is then placed down-stream of this catalyst to measure the oxygen concentration of the exhaust stream after the exhaust has contacted the catalyst.

In certain embodiments of the invention, the catalyst can include two or more catalytic zones. For example, the catalyst can include an upstream catalytic layer and a downstream catalytic layer. In these embodiments, the downstream HEGO sensor can be placed between zones, so long as the UEGO sensor is located in front of the catalyst to measure the oxygen concentration from the engine before it contacts the catalyst.

Any exhaust gas oxygen sensor can be positioned behind the catalysts in the invention, including a HEGO or a UEGO. Both sensor types possess a PGM component-based coating that is capable of differentiating and therefore indicating oxygen concentration in the residual gases and in the ambient gas.

While their use in the invention relates to measuring the oxygen storage capacity of the catalyst, those of ordinary skill in the art will recognize that EGO sensors commonly are also used for controlling engine fueling.

The first and second layers can be included without limitation into layered composites that have at least one catalyst, i.e., PGM component, layer. Of course, there can be more than one catalytic layer and each catalytic layer can include more than one zone. Moreover, the first and second layers can be used in catalysts that also contain pollutant trap zones or layers, e.g., hydrocarbon and/or $NO_x$ zones/layers.

The exhaust gas treatment catalyst of the invention comprises:
 (a) a carrier;
 (b) a first layer deposited on the carrier, said first layer comprising substantially only one or more refractive metal oxides;

(c) a second layer deposited on the first layer, said second layer comprising substantially only at least one oxygen storage component and at least one binder therefor; and (d) a third layer deposited on the second layer, said third layer comprising at least one layer of one or more platinum group metal components supported on a refractory metal oxide support.

For the purposes of the present invention, the term "substantially only" as employed in describing the first and second layers shall mean that there is no more than a total of about 12 wt. % of other active ingredients in the indicated layer other than optional stabilizers which may be present in the amount of about 1 to about 12 wt. % of each indicated layer.

The first, i.e., the bottom, layer is deposited on a carrier. Preferably, the first layer adheres to and is supported directly on the carrier. In other words, the first layer serves as the bottom-most layer. The second layer is disposed on top of the first layer. The catalytic layers, comprised of platinum group metal components, are disposed on top of the second layer.

Any suitable carrier can be employed, such as a monolithic carrier of the type having a plurality of fine, parallel gas flow passages extending therethrough from an inlet or an outlet face of the carrier, so that the passages are open to fluid flow therethrough (also known as honeycomb carriers). The passages, that are essentially straight from their fluid inlet to their fluid outlet, are defined by walls. The flow passages of the monolithic carrier are thin-walled channels that can be of any suitable cross-sectional shape and size, such as trapezoidal, rectangular, square, sinusoidal, hexagonal, oval or circular, but typically, the flow passages have a hexagonal, rectangular or square shape. Such structures can contain from about 60 to about 1200 or more gas inlet openings ("cells") per square inch of cross section. Carriers can be of the ceramic type or of the metallic type.

The ceramic carrier can be made of any suitable refractory material, e.g., cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as titanium, stainless steel or other suitable iron based corrosion resistant alloys.

Figure 6:
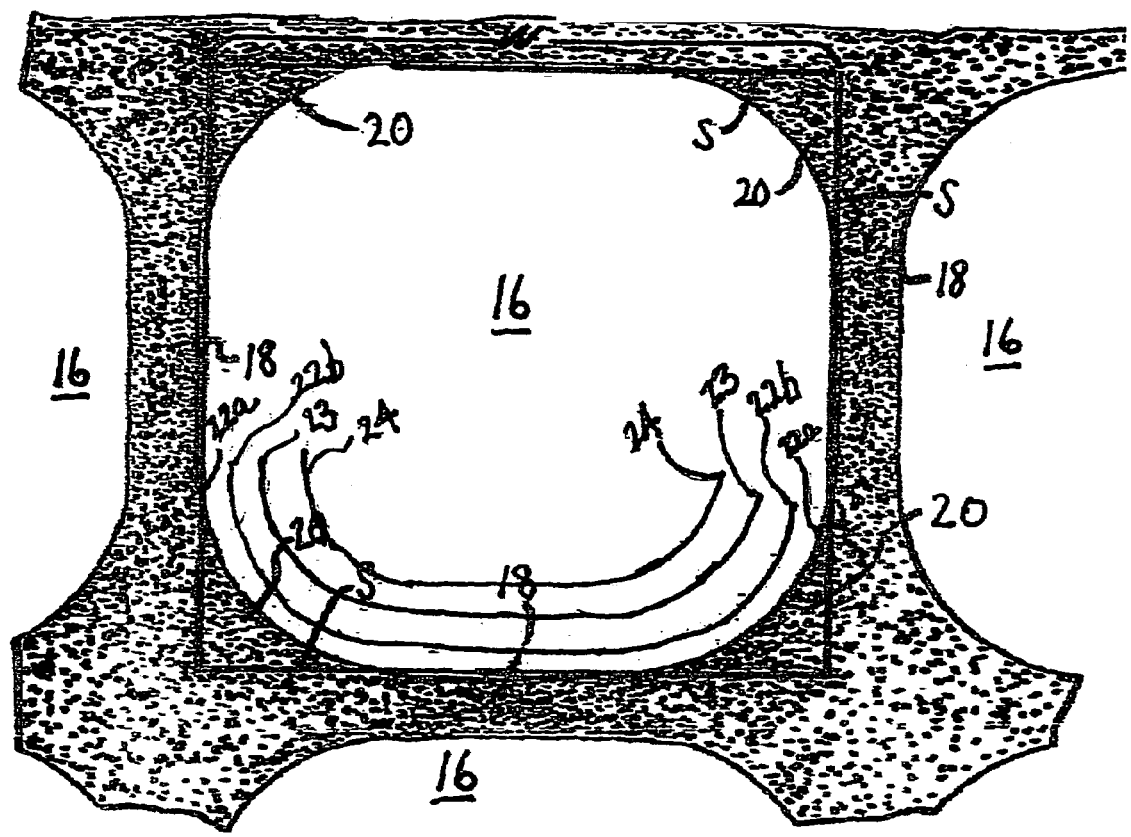
FIG. 6 is a view on a further enlarged scale of one of the fluid flow channels of the drawing of FIG. 5.

An additional advantage of the invention includes providing an improved coating architecture for certain commonly used monoliths. For monoliths containing channels with a rectangular or square shape, the first, i.e., bottom, layer effectively rounds off the corners thus creating a more effective coating surface for subsequent layers, such as the oxygen storage component layer and the catalytic layers containing platinum group metals as catalytic agents, that are coated on top of the bottom layer. The rounding-off of the corners is illustrated in FIG. 6 and is discussed in greater detail below. The second layer can be adhered directly on the bottom layer and a catalytic layer including a PGM catalytic agent, for example, can be adhered directly on the second layer. The rounded corners prevent the catalyst washcoat from deposition in the corners where it is less accessible for contacting the exhaust gas. Due to the increased accessibility of the catalytic layer to the exhaust gas, a thinner washcoat of the catalytic layer can be used in the catalyst without sacrificing TWC catalyst performance. The thinner catalytic layer is formed from washcoat compositions having lower solids content than catalyst washcoat compositions used in preparing conventional TWC catalysts. This feature significantly reduces platinum group metal use and cost without sacrificing TWC efficiency.

FIG. 2 depicts a layered composite of the invention having a single channel (20). A discrete coat of the bottom layer (22a) comprising substantially only a refractory metal oxide is coated as a "washcoat" onto carrier wall (21). Thereafter, a discrete coat of the second layer (22b) comprising substantially only at least one oxygen storage component and at least one binder therefor is coated as a washcoat onto the surface of layer (22a). Subsequently, a discrete coat of the third layer (23) comprising a catalytic material is coated as a washcoat onto the surface of second layer (22b) and a discrete coat of the fourth layer (24). The optional overcoat layer that may be coated as a discrete layer on the surface of layer (24) is not depicted in FIG. 2. The bottom layer (22a) would be coated on and adhered to the carrier wall (21). The second layer (22b) would be adhered to the bottom layer (22a). The third layer (23) overlying and adhering to the second layer (22b) and the fourth layer (24) overlying and adhering to the third layer (23) would be provided in one zone. With this arrangement, the gas being contacted with the catalyst, e.g., being flowed through the passageways of the catalytic material-coated carrier, will first contact the fourth layer (24), pass therethrough in order to contact the third layer (23), thereafter contacting the second layer (22b) and then lastly will contact the bottom layer (22a). The multi-layered composite depicted in FIG. 2 can be located in a close-coupled position or, alternatively, in an underbody position.

In an alternative configuration, the fourth layer need not overlie the third layer but can be provided in an upstream first zone (as sensed in the direction of gas flow through the catalyst composition) portion of the carrier, with the third layer provided on a downstream second zone portion with both zones supported on the second layer which in turn is supported on the bottom layer. In order to apply the washcoat in this configuration, an upstream first zone longitudinal segment only of the carrier (which had been previously coated with the bottom and the second layers) would be dipped into a slurry of the fourth layer of catalytic material, and dried, and the downstream second zone longitudinal segment of the carrier would then be dipped into a slurry of the third layer of catalytic material and dried.

Another preferred catalyst of the invention is a multi-zoned, multi-layered composite. As is shown in a channel (30) of this catalyst depicted in FIG. 3, this catalyst has a bottom refractory metal oxide layer (32a) overlying and adhering to the carrier wall (31), preferably of a honeycomb carrier, a second oxygen storage component+binder layer (32b) on top of and adhering to the bottom layer, a third catalytic layer on top of and overlying and adhering to the second layer and a fourth catalytic layer overlying and adhering to the third layer. Each third and fourth catalytic layer contains two zones, an upstream and a downstream zone. The second upstream zone (35) overlies and adheres to the first upstream zone (33), and the second downstream zone (36) overlies and adheres to the first downstream zone (34). Each of the first upstream, second upstream, first downstream, and second downstream zones are catalytic zones.

The first upstream zone contains a first upstream platinum component, a first upstream palladium component, and a first upstream refractory metal oxide support. The first downstream zone has a first downstream platinum component, a first downstream rhodium and a first downstream refractory metal oxide support. The second upstream zone includes a second upstream platinum component, a second upstream rhodium component, and a second upstream refractory metal oxide support. The second downstream zone has a second downstream platinum component, a second downstream palladium component and a second downstream refractory metal oxide support. The upstream and downstream zones can be reversed if hydrocarbon conversion has the higher priority than NOx conversion.

Figure 4:
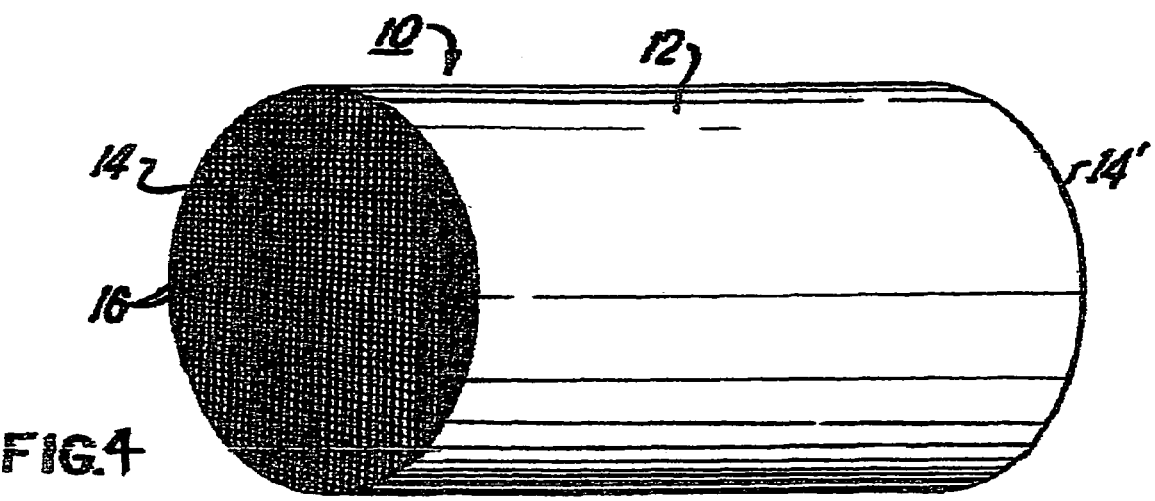
FIG. 4 is a perspective view of one embodiment of a monolithic catalyst carrier upon which the multiple layers of the exhaust treatment catalyst of the invention are deposited.
Figure 5:
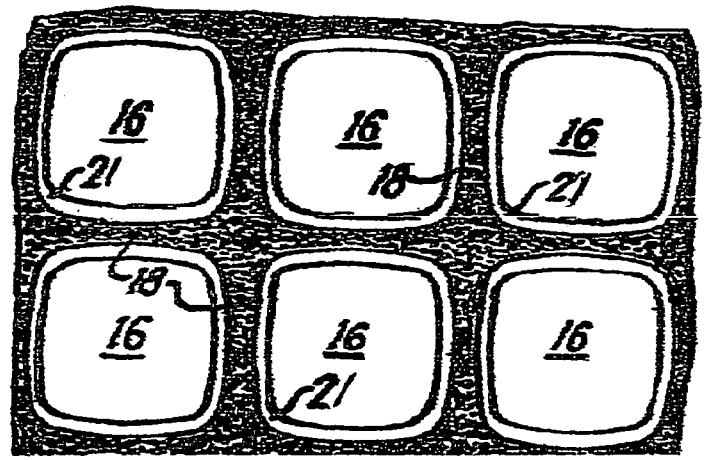
FIG. 5 is a partial cross-sectional view on an enlarged scale taken along a plane parallel to the end faces of the carrier of FIG. 4.

FIG. 4 shows generally at 10 a catalyst carrier illustrating a preferred embodiment of the present invention. The carrier is seen to be monolithic and of generally cylindrical shape having a cylindrical outer surface 12; one end face (inlet) 14 and an opposite end face, not visible in FIG. 4, which is identical to end face 14. The juncture of outer surface 12 with the opposite end face at its peripheral edge portion is indicated at 14' in FIG. 1. Carrier 10 has a plurality of fluid flow channels formed therein, and, since a preferred embodiment of the present invention is adapted for the treatment of engine exhaust gases, these channels are referred to as gas flow channels 16, better seen in enlarged FIG. 5. Channel walls 21 form gas flow channels 16. Gas flow channels 16 extend through carrier 10 from end face 14 to the opposite end face thereof, the channels being unobstructed so as to permit the flow of a fluid, e.g., a gas, longitudinally through carrier 10 via gas flow channels 16 thereof. As may be seen from FIGS. 5 and 6, channel walls 21 are dimensioned and configured such that gas flow channels 16 have substantially regular polygonal shape, square in the illustrate embodiment, except for fillet portions 20 which, in the illustrated embodiment, define in profile arcuate concave sections and comprise the juncture of adjacent ones of walls 18.

In FIG. 6, the width in cross section of channels 16 is indicated by W, the width in cross section of any side of the geometric square figure S superimposed on the cross sectional view of gas channel 16. Each side of the square figure S defines the nominal width W in cross section of the regular polygon approximated by the cross section profile of gas channel 16. The width W corresponds to the straight line distance extending perpendicularly from the substantially flat planar mid-portion of one channel 18 wall to that of an opposite wall 18. As shown in FIG. 6, bottom refractory metal oxide layer 22a is deposited upon the surface of wall 21, effectively rounding off corners 20. Second oxygen storage component layer 22b is deposited upon layer 22a. Third catalytic layer 23 is deposited upon layer 22b and fourth catalytic layer 24 is deposited upon catalytic layer 23. The deposition of layers 22a, 22b, 23 and 24 is shown only on the lower half of gas flow channel 16 for illustrative purposes.

For the purposes of the present invention, the refractory metal oxide support that is employed in the first, third and, if employed the fourth, layers is independently selected from the group consisting of alumina; titania; zirconia; mixtures of alumina with one or more of titania, zirconia, and ceria; ceria coated on alumina; and titania coated on alumina. Preferably, the refractory metal oxide support employed in all of the layers is a high surface area alumina such as an α, δ, γ and/or θ alumina having a BET specific surface area of about 40 to about 400 m$^2$/g. Typically, the refractory metal oxide support will be employed in an amount of about 0.1 to about 2.0 g/in$^3$.

In a typical preparation of the bottom layer, a mixture of the refractory metal oxide support, e.g., activated alumina, and a suitable vehicle, preferably water, is ball-milled for a suitable time to obtain 90% of the particles having a particle size of less than about 20, preferably less than 10 microns. The ball-milled composition can be combined with the suitable vehicle in an amount from 30 to 50 wt. % solids, preferably from 35 to 45 wt. % solids.

The refractory metal oxide support can be deposited onto the carrier to form the bottom layer by any method known to those of ordinary skill in the art. For example, the refractory metal oxide washcoat can be prepared and applied to a suitable substrate, preferably a metal or ceramic honeycomb carrier. The bottom layer composition can be deposited on the carrier in any desired amount. The amount of the refractory metal oxide coating can be controlled, for example, by adjusting the percent solids of the coating slurry. For example in one preferred embodiment, a washcoat having from about 32 to 35 wt. % solids will result in a concentration of about 1 g/in$^3$ of the bottom layer, when deposited on the monolith carrier.

The bottom layer deposited on the carrier is generally formed as a coating over most, if not all, of the surfaces of the carrier contacted. The combined structure can be dried and calcined, preferably at a temperature of at least about 250° C.

The second layer overlying and adhered to the bottom layer comprises substantially only at least one oxygen storage component and at least one binder therefor. The oxygen storage component(s) in the second layer preferably comprises at least one oxide of a metal selected from the group consisting of rare earth metals and most preferably a cerium or praseodymium compound with the most preferred oxygen storage component being cerium oxide (ceria). Preferably, the oxygen storage component is in bulk form. By bulk form, it is meant that a composition is in a solid, preferably as fine particles that can be as small as 1 to 15 microns in diameter or smaller. Preferably, the oxygen storage component is present in at least 10% by weight, more preferably at least 20% by weight of the second layer. Preferably, ceria serves as the second layer oxygen storage component and comprises between about 70 and 100% by weight of the total oxygen storage component in the second layer. When praseodymia is used, it is preferably used in combination with, but not limited to, ceria and can amount to up to 20% by weight of the oxygen storage component of the second layer.

In some embodiments, it is advantageous to incorporate a bulk fine particulate material of co-formed ceria-zirconia composite into the second layer as an oxygen storage component as described in U.S. Pat. No. 5,057,483. These particles do not react with stabilized alumina washcoat and maintain a BET surface area of above 40 m$^2$/g upon exposure to 900° C. for a long period of time. Ceria is preferably dispersed homogeneously throughout the zirconia matrix from about 5 to about 85 wt. % of the total weight of the ceria-zirconia composite to form a solid solution. The co-formed (e.g. co-precipitated) ceria-zirconia particulate composite can enhance the ceria utility in particles containing ceria-zirconia mixture. The ceria acts as an oxygen storage component and provides the zirconia stabilization. The '483 patent discloses that neodymium and/or yttrium can be added to the ceria-zirconia composite to modify the resultant oxide properties as desired. The rare earth oxide-zirconia composite is preferably present in the amount of about 0.3 g/in$^3$ to about 2.5 g/in$^3$, preferably 0.6 g/in$^3$ to about 1.5 g/in$^3$ of the finished second layer.

The amount of oxygen storage component in the second layer is preferably an amount sufficient so that the catalyst's deterioration in its oxygen storage capacity can be correlated with the deterioration in catalyst's TWC performance. The type of OSC should be selected in the way that the stability of the OSC closely resembles that of the PGM-containing layers. For example, when the catalyst's ability to reduce hydrocarbons, carbon monoxide or nitrogen oxides in the exhaust stream falls below a certain level, there is also an increase in the switching ratio (e.g., downstream EGO/upstream EGO) detected by the OBD system due to the deteriorated oxygen storage capacity. This correlation can therefore be achieved by calibration of the deterioration of the OSC of the catalyst with the deterioration of the TWC performance. The OBD system can then provide a signal to the vehicle operator indicating the need for exhaust system maintenance. As a general rule, the oxygen storage component will be present in the second layer in an amount of about 0.05 to about 2.5 g/in$^3$ of the finished second layer.

Preferably, the OSC comprises one or more rare earth metal oxides such as a rare earth metal oxide ceria, praseodymia, a ceria-praseodymia composite, a ceria-praseodymia-zirconia composite and a ceria-praseodymia-zirconia-neodymia composite.

In order to satisfactorily adhere the second layer to the surface of the bottom layer, it is generally necessary to employ a binder with the oxygen storage component. Suitable binders comprise metal oxides selected from the group consisting of zirconia (which is preferred), alumina, silica and silica-alumina. Typically, the binder will be present in the amount of about 0.02 to about 1.5 g/in in$^3$ of the second layer.

The second layer may be prepared and deposited on, and adhered to the surface of, the bottom layer in a manner similar to that employed for the deposition of the bottom layer on the surface of the carrier. In a typical preparation, a mixture of the oxygen storage component, the binder and a suitable vehicle, preferably water, is ball-milled for a suitable time to obtain 90% of the particles having a particle size of less than about 20, preferably less than 10 microns. The selected oxygen storage component(s) and the binder may be used in the form of their oxides or as water-soluble salts, e.g., acetate, nitrate, etc. (the salts will be converted to their respective oxide forms upon calcination). The ball-milled composition can be combined with the suitable vehicle in an amount from 30 to 50 wt. % solids, preferably from 35 to 45 wt. % solids.

The second layer can be deposited onto the bottom layer by any method known to those of ordinary skill in the art. For example, the second layer composition may be applied to the surface of the bottom layer as an aqueous washcoat. The second layer composition can be deposited on the surface of the first layer in any desired amount. The amount of the second layer coating can be controlled, for example, by adjusting the percent solids of the coating slurry. For example in one preferred embodiment, a washcoat having from about 32 to 35 wt. % solids will result in a concentration of about 1 g/in$^3$ of the second layer, when deposited on the surface of the first layer.

The second layer deposited on the bottom layer is generally formed as a coating over most, if not all, of the surfaces of the first layer contacted. The combined structure can be dried and calcined, preferably at a temperature of at least about 250° C.

The second layer can be used with any catalytic layer for preparing a catalyst that can accommodate the oxygen storage requirements of a particular exhaust platform. In some embodiments, there are at least two catalytic layers. In other embodiments, a single catalytic layer can have more than one catalytic zone, with each catalytic zone formed from a discrete catalytic washcoat composition. For instance, a catalytic layer can have an upstream catalytic zone and a downstream catalytic zone. In other embodiments, there can be a plurality of catalytic layers with each layer having multiple catalytic zones, e.g., upstream, downstream, and intermediate zones.

The multi-zoned, multi-layered catalyst composites of the invention are sufficiently effective to eliminate a significant amount of pollutants at low temperature while at the same time being stable over long periods of engine operation. These properties make the exhaust treatment catalysts particularly usefull as stable close-coupled catalysts. Close-coupled catalysts are placed close to an engine to enable them to reach reaction temperatures as soon as possible. Preferably the close-coupled catalyst is placed within one foot of the engine, more preferably less than six inches. Close-coupled catalysts are often attached directly to the exhaust gas manifold. Close-coupled catalysts are designed to reduce hydrocarbon emissions from gasoline engines during cold starts. More particularly, close-coupled catalyst are designed to reduce pollutants in automotive engine exhaust gas streams at temperatures as low as 350° C., preferably as low as 300° C. and more preferably as low as 200° C. Due to their close proximity to the engine, close-coupled catalysts are preferably stable at high temperatures, e.g., up to 1100° C., during the operating life of the engine. Methods of using close-coupled catalysts are described in U.S. Pat. No. 6,044,644, incorporated by reference herein.

One preferred exhaust article of the invention has a multi-zone, three-layered catalyst composite of the type described above as a close-coupled catalyst and a downstream underbody catalyst comprising the earlier described layered composite catalyst (Pt/Rh or Pd/Rh). The upstream UEGO sensor in this particular configuration can be mounted upstream of the first catalyst (the multi-zone, three-layer catalyst composite) to measure the AT perturbation from the engine outlet and the downstream HEGO can be placed downstream of the first catalyst and upstream of the second catalyst.

Catalytic layers are formed from catalytic washcoat compositions. Preferred catalytic washcoat compositions contain platinum group metal components as catalytic agents and a support of a refractory metal oxide such as activated alumina. Each catalytic composition can optionally contain an alkaline earth oxide as a stabilizer and and/or a rare earth metal component selected from the group consisting of lanthanum or neodymium components as a promoter. Optionally, the second layer composition can also contain an alkaline earth oxide as a stabilizer and/or a rare earth metal component selected from the group consisting of lanthanum or neodymium components as a promoter. Neither stabilizers nor promoters are necessary for the first layer, but they can be included in the first layer composition, if desired.

Useful catalytic agents include at least one of the platinum group metal components, i.e., palladium, platinum, rhodium, ruthenium, and iridium components, with platinum, palladium and/or rhodium being preferred. Catalytic agents are typically used in amounts of about 1 to about 400 g/ft$^3$, preferably from 3 to 250 g/ft$^3$, depending on the metal. Amounts of platinum group metal components are based on weight divided by carrier volume, and are typically expressed in grams of material per cubic foot.

As will be apparent to those of ordinary skill in the art, the platinum group metal components, acting as catalytic agents, can exist in the catalyst in multiple oxidation states while in use. By way of example, a palladium component can exist as palladium metal (0), Pd (II), and Pd (IV) in the catalyst. In a preferred method of preparing the catalyst, a platinum group metal component such as a suitable compound and/or complex of the platinum group metals can be utilized to achieve dispersion of the catalytic component on a support, e.g., activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of platinum group metals can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

Useful catalytic supports include any of the refractory metal oxides mentioned above, such as one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. Preferably, the support is substantially comprised of alumina which preferably includes the members of the gamma or activated alumina family, such as gamma, alpha, delta, eta and/or theta aluminas, and, if present, a minor amount of other refractory oxides, e.g., about up to 20 weight percent. Preferably, the support comprises γ-alumina having a BET specific surface area of about 40 to about 400 $m^2/g$.

The selection of the platinum group metal component may vary from one layer to the other, from one zone of a layer to another zone of a layer or both. For example, the platinum group metal components employed in the third layer may comprise a mixture of platinum and palladium, while the platinum group metal components in the fourth layer may comprise a mixture of platinum and rhodium. Alternatively, the platinum group metal components employed in the third layer may comprise a mixture of platinum and rhodium, while the platinum group metal components in the fourth layer may comprise a mixture of platinum and palladium. The particular choice of the platinum group metal components to be used individually or as mixtures in a particular layer and/or zone will depend on the characteristics of the exhaust gas stream being treated, i.e., whether reduction in the level of unburned hydrocarbons or reduction in the level of nitrogen oxides is of paramount importance.

The second, third and/or fourth layers can optionally contain one or more stabilizers. Suitable stabilizers are the alkaline earth metal oxides, i.e., one or more oxides of magnesium, barium, calcium or strontium, with barium oxide and strontium oxide being preferred and barium oxide being most preferred. In respect to the second layer, stabilization means that the oxygen storage/discharge efficiency of the oxygen storage component composition of the second layer is maintained for a longer period of time at elevated temperatures. The alkaline earth metal can be applied in a soluble form that upon calcining becomes the oxide. For example, soluble barium can be provided as barium nitrate, barium acetate or barium hydroxide and soluble strontium provided as strontium nitrate or strontium acetate, all of which upon calcining become the oxides.

Typically, the stabilizer will be employed in the second, third and/or fourth layers in an amount of about 0.05 to about 30 wt. %, preferably 0.1 to 25 wt. %, most preferably 5% to 15%, based on the total weight of the particular layer.

The second, third and/or the fourth layers can optionally contain a promoter comprising a lanthanum and/or a neodymium component. These components may be utilized in their oxide forms or as soluble salts that, upon calcination are converted to their oxide forms. It is believed that these components act as reaction promoters in respect to the catalytic compositions employed in the exhaust treatment catalysts of the invention. In respect to the TWC compositions, the promoter enhances the conversion of carbon monoxide into carbon dioxide, and hydrocarbons into water and carbon dioxide, and nitrogen oxides into nitrogen and oxygen.

The lanthanum and/or neodymium components are preferably formed from precursors, such as soluble salts including acetates, halides, nitrates, sulfates and the like. Preferably, the promoter is in intimate contact with other components in the composition including and in particular, the platinum group metal components. The promoters may be added as the solutions of the soluble promoters, either into slurry before or after milling, or, be impregnated the solid components prior to PGM introduction for their conversion to oxides after calcination. The promoters may be employed in the second, third and/or fourth layers in an amount of about 0.05 to about 30 wt. %, preferably 0.1 to 25 wt. %, most preferably 1% to 15%, based on the total weight of the particular layer.

The catalytic washcoats employed in the present invention can be made by any suitable method. One preferred method includes preparing a mixture of at least one water-soluble or dispersible, platinum group metal component and a finely divided, high surface area, porous refractory metal oxide which is sufficiently dry to absorb essentially all of the solution during impregnation to form a supported platinum group metal component. If more than one platinum group metal component is used in the catalytic washcoat composition, the additional platinum group metal component(s), can be supported on the same or different refractory oxide particles as the first platinum group metal component by the same impregnation method in sequence or in parallel.

The supported platinum group metal component or plurality of such supported platinum group metal components are then added to water along with other additives, and comminuted by a ball mill or other suitable equipment to form a slurry. Preferably, the slurry is acidic, having a pH of less than 7 and preferably from 3 to 7. The pH is preferably lowered by the addition of an acid, preferably acetic or nitric acid, to the slurry. In preferred embodiments, the catalytic washcoat slurry is comminuted to result in substantially all of the solids having particle sizes of less than 10 or 15 micrometers in average diameter. At this point stabilizing components such as barium and strontium acetate, and promoting components including lanthanum acetate can be added and the composition is milled further. The catalytic washcoat slurry can he formed into a catalytic layer on the second layer, previously coated on the bottom layer (or on a previously applied catalytic layer), and dried. The platinum group components and as well additives provided in soluble form in the catalytic layer are converted to a water insoluble form chemically or by calcining. The catalytic layers are preferably calcined, preferably at temperatures of at least 250° C.

Alternatively, each upstream layer of the present composite can also be prepared by the method disclosed in U.S. Pat. No. 4,134,860 (incorporated by reference) generally recited as follows. A finely-divided, high surface area, refractory metal oxide support is contacted with a solution of a water-soluble, platinum group metal component to provide a mixture which is essentially devoid of free or unabsorbed liquid. The platinum group metal component of the solid, finely divided mixture can be converted at this point in the process into an essentially water-insoluble form while the mixture remains essentially free of unabsorbed liquid. This process can be accomplished by employing a refractory metal oxide support, e.g., alumina, including stabilized aluminas, which is sufficiently dry to absorb essentially all of the solution containing the platinum group metal component, i.e., the amounts of the solution and the support, as well as the moisture content of the latter, are such that their mixture has an essential absence of free or unabsorbed solution when the addition of the platinum group metal component is complete. During the latter conversion or fixing of the catalytically promoting metal component on the support, the composite remains essentially dry, i.e., it has substantially no separate or free liquid phase.

The mixture containing the fixed, platinum group metal component can be comminuted as a slurry which is preferably acidic, to provide solid particles that are advantageously primarily of a size of up to about 5 to 15 microns. The resulting washcoat slurry is deposited on the second layer that has been coated on the bottom layer or on a previously applied catalytic layer. The composite is then dried and can be calcined. When more than one catalytic washcoat is applied, each washcoat can be sequentially applied and calcined to form layered composites of the present invention. In order to deposit a plurality of catalytic washcoat slurries on a macro sized carrier, one or more comminuted slurries are applied to the second layer in any desired manner. Thus, the carrier coated with the first and second layers can be dipped one or more times in the catalytic washcoat slurry, with intermediate drying if desired, until the appropriate amount of slurry is on the carrier. The slurry employed in depositing the supported platinum group metal component-high area support composite on the carrier will often contain about 15 to 60 weight percent of finely divided solids, preferably about 25 to 50 weight percent. Preferred methods for preparing zone-coated carriers are described in co-pending U.S. application Ser. No. 09/873,979 filed Apr. 28, 1998, the disclosure of which is incorporated by reference herein.

Optionally, an overcoat layer may be disposed on top of the third, or if two catalytic layers are present, on top of the fourth layer. The optional overcoat layer is comprised of a material that has the capability of absorbing contaminants in the exhaust gas stream that might otherwise poison the third and/or the fourth catalytic layers, such as a catalyst poisons (e.g., phosphorous, zinc, and $SO_x$) sorbent. Suitable catalyst poisons sorbents are selected from the group consisting of oxides of lithium, magnesium, calcium, strontium, barium, ceria, manganese, iron, cobalt, nickel, copper, zinc and silver, alone or in combination with an aluminum and/or zirconium oxide. Preferably, the catalyst poisons sorbent is selected from the group consisting of MgO, $MgAl_2O_4$, MnO, $MnO_2$ and $Li_2O$; the especially preferred $SO_x$ catalyst poisons sorbents are MgO and $Li_2O$. Typically, the catalyst poisons sorbent will be utilized in conjunction with a refractory metal oxide support and will be present in the amount of about 0.3 to about 1.8 $g/in^3$. The concentration of the catalyst poisons sorbent can be up to 40%, preferably 1 to 15%. Further details regarding the use of such sorbents may be found in Published U.S. patent application No. 20030021745 A1, the disclosure of which is incorporated herein by reference.

Optionally, the third and/or the fourth layers can contain at least one OSC and at least one binder therefor of the type described above. If present in the third and/or the fourth layers, the OSC(s) will typically be utilized in an amount of about 0.05 to about 2.5 $g/in^3$ of the layer and the binder(s) therefor will typically be utilized in an amount of about 0.02 to about 1.5 $g/in^3$ of the layer.

The following nonlimiting examples shall serve to illustrate the various embodiments of the present invention. Unless otherwise indicated, all amounts and percentages are on a weight basis.

EXAMPLE 1

A catalyst was prepared in the following manner:

A cylindrical cordierite honeycomb substrate was used as the carrier. The carrier had a diameter of 4.16 inches, a length of 3.82 inches and a total volume of 52 $in^3$. The total PGM content of the catalyst was 40 $g/ft^3$. The PGM components consisted of platinum, palladium and rhodium in a ratio of 2:28:10, respectively.

A bottom (i.e., the first) layer was applied to the surface of the carrier by immersing the carrier in an approximately 35% solid content aqueous slurry containing 800 g gamma-alumina, 50 g alumina binder and 100 g of a composite of 92% zirconia and 8% lanthana. The thus-coated carrier was then calcined at 430° C. for 2 hours to obtain a dried washcoat at approximately 0.95 $g/in^3$.

A middle (i.e., the second) layer in the form of an aqueous solution was then applied to the surface of the coated carrier. The middle layer consisted of an approximately 38% solid content, aqueous solution containing 70 g alumina binder, 50 g zirconia binder, 600 g of a Ce/Zr (38% Ce) oxygen storage component composite and 60 g strontia. The resultant carrier was then calcined at 430° C. for 2 hours to obtain a dried washcoat at approximately 0.78 $g/in^3$.

A top (i.e., the third) layer in the form of an aqueous media was then applied to the surface of the middle layer. The top layer aqueous media contained 5.8 g rhodium impregnated as rhodium nitrate solution by a Planetary mixer into a combination of 350 g γ-alumina, and 50 g of a Ce/Zr (5% Ce) oxygen storage component composite, 0.6 g platinum impregnated as a platinum amine solution by a Planetary mixer into 250 g of a Ce/Zr (36% Ce) oxygen storage component composite and 40 g zirconia binder. The resultant carrier was then calcined at 430° C. for 2 hours to obtain a dried wash coat at approximately 70 $g/in^3$.

An overcoat layer was then applied to the surface of the top layer. The overcoat layer aqueous media had an approximately 35% solids content and contained 450 g of a lanthana-stabilized γ-alumina in which 16.2 g palladium was impregnated as palladium nitrate solution by a Planetary mixer, 40 g zirconia binder, 30 g alumina binder 80 g strontia as alkaline promoter and $SO_x$ trap and 0.6 g platinum as platinum amine solution introduced into the milled slurry.

The resultant carrier was then calcined at 500° C. for 2 hours to obtain a dried washcoat at approximately 72 g/in³.

EXAMPLE 2

Example 1 was repeated, except that the top layer and overcoat layer formulations were reversed. That is, the overcoat formulation recited in Example 1 was applied to the surface of the middle layer. After calcination, the top layer formulation of Example 1 was applied to the surface of the resultant carrier that was then calcined at 500° C. for 2 hours.

EXAMPLE 3

The catalysts of Examples 1 and 2 were evaluated on a 2.2-liter, 4-cylinder vehicle in accordance with Federal Test Protocol #75. Hydrocarbon and $NO_x$ emission (grams per mile) data were gathered for each catalyst for three phases: cold start, cruising and hot start. The results for each phase are set forth below in the following table.

|  | Example 1 Catalyst | Example 2 Catalyst |
| --- | --- | --- |
| HC Emissions - Cold Start | 0.019 | 0.025 |
| HC Emissions - Cruising | 0.004 | 0.004 |
| HC Emissions - Hot Start | 0.005 | 0.005 |
| $NO_x$ Emissions - Cold Start | 0.038 | 0.034 |
| $NO_x$ Emissions - Cruising | 0.042 | 0.027 |
| $NO_x$ Emissions - Hot Start | 0.031 | 0.024 |

What is claimed is:

1. An exhaust gas treatment catalyst comprising: (a) a carrier; (b) a first washcoat layer deposited on the carrier, said first washcoat layer comprising substantially only at least one refractory metal oxide; (c) a second washcoat layer deposited on the first washcoat layer, said second washcoat layer comprising substantially only at least one oxygen storage component and at least one binder therefor; and (d) a third washcoat layer deposited on the second washcoat layer, said third washcoat layer comprising at least one layer of one or more platinum group metal components supported on a refractory metal oxide support.

2. The catalyst of claim 1 wherein the third washcoat layer further comprises at least one oxygen storage component and at least one binder therefor.

3. The catalyst of claim 1 further comprising a fourth washcoat layer deposited on the third washcoat layer, said fourth washcoat layer comprising one or more platinum group metal components supported on a refractory metal oxide support.

4. The catalyst of claim 3 wherein the fourth washcoat layer further comprises at least one oxygen storage component and at least one binder therefor.

5. The catalyst of claim 3 wherein the refractory metal oxide employed in the first layer, third layer and the fourth layer is independently selected from the group consisting of alumina; titania; zirconia; mixtures of alumina with one or more of titania, zirconia, and ceria; ceria coated on alumina; and titania coated on alumina.

6. The catalyst of claim 3 further comprising an overcoat layer deposited on the third or the fourth washcoat layer, said overcoat layer comprising at least one catalyst poisons sorbent.

7. The catalyst of claim 6 wherein the carrier comprises a ceramic or metal having a honeycomb cellular structure comprising hexagonal, rectangular or square cells.

8. The catalyst of claim 7 wherein the first, second, third, fourth and overcoat layers have thicknesses at their respective edges and corners of the cells as follows:

| Layer | Edge Thickness, μ | Corner Thickness, μ |
| --- | --- | --- |
| First | about 3 to about 15 | about 30 to about 200 |
| Second | about 5 to about 15 | about 30 to about 100 |
| Third | about 5 to about 15 | about 30 to about 100 |
| Fourth | about 5 to about 15 | about 30 to about 100 |
| Overcoat | about 5 to about 15 | about 30 to about 100. |

9. An exhaust gas treatment system comprising the catalyst of claim 7, an upstream EGO or air/fuel ratio sensor, and a downstream EGO sensor.

10. An exhaust gas treatment system comprising the catalyst of claim 3, an upstream EGO or air/fuel ratio sensor, and a downstream EGO sensor.

11. The catalyst of claim 1 wherein the oxygen storage component is selected from the group consisting of ceria, praseodymia, a ceria-praseodymia composite, a ceria-praseodymia-zirconia composite and a ceria-praseodymia-zirconia-neodymia composite, and the binder comprises zirconia.

12. The catalyst of claim 1 wherein the catalyst comprises at least two catalytic zones.

13. The catalyst of claim 1, wherein the first layer comprises at least 76 weight % of one refractory metal oxide.

14. The catalyst of claim 13, wherein the first layer comprises active ingredients in a quantity not exceeding approximately 12 weight %.

15. The catalyst of claim 14, wherein the first layer comprises stabilizers in a quantity not exceeding approximately 12 weight %.

16. The catalyst of claim 15, wherein the second layer comprises at least 76 weight % of one refractory metal oxide.

17. The catalyst of claim 16, wherein the second layer comprises active ingredients in a quantity not exceeding approximately 12 weight %.

18. The catalyst of claim 17, wherein the second layer comprises stabilizers in a quantity not exceeding approximately 12 weight %.

19. An exhaust gas treatment system comprising the catalyst of claim 1, an upstream EGO or air/fuel ratio sensor, and a downstream EGO sensor.

* * * * *

UNITED STATES PATENT AND TRADEMARK OFFICE
CERTIFICATE OF CORRECTION

PATENT NO. : 7,374,729 B2  
APPLICATION NO. : 10/812542  
DATED : May 20, 2008  
INVENTOR(S) : Shau-Lin Franklin Chen and Zhicheng Hu It is certified that error appears in the above-identified patent and that said Letters Patent is hereby corrected as shown below:

Title Page item (74); change the name of Attorney, Agent, or Firm name from "Serrilla" to -- Servilla --.

Column 16, line 59, change "70 g/in$^3$" to -- 70 g or 1.35 g/in$^3$ --

Column 17, line 2, change "72 g/in$^3$" to -- 72 g or 1.38 g/in$^3$ --

Signed and Sealed this

Twenty-ninth Day of July, 2008

JON W. DUDAS  
*Director of the United States Patent and Trademark Office*